United States Patent
Rizza

(10) Patent No.: US 7,322,443 B1
(45) Date of Patent: *Jan. 29, 2008

(54) DEVICE FOR ATTACHING TO A TREE AND STABILIZING A BOWMAN ATTACHED THERETO WHO IS HUNTING GAME

(76) Inventor: Joseph Rizza, 100 Ferry Rd., Flemington, NJ (US) 08822

( * ) Notice: Subject to any disclaimer, the term of this patent is extended or adjusted under 35 U.S.C. 154(b) by 501 days.

This patent is subject to a terminal disclaimer.

(21) Appl. No.: 10/372,688

(22) Filed: Feb. 24, 2003

Related U.S. Application Data

(63) Continuation-in-part of application No. 09/688,913, filed on Oct. 16, 2000, now Pat. No. 6,523,643.

(51) Int. Cl.
*A01M 31/02* (2006.01)

(52) U.S. Cl. ...................................... 182/187; 182/188

(58) Field of Classification Search ................ 182/187, 182/116, 8, 3, 9, 188
See application file for complete search history.

(56) References Cited

U.S. PATENT DOCUMENTS

| | | | | |
|---|---|---|---|---|
| 784,390 A * | 3/1905 | Dunham | ......................... | 42/94 |
| 1,187,100 A * | 6/1916 | Rooth | ............................ | 42/94 |
| 2,879,830 A * | 3/1959 | Johnson | ......................... | 182/9 |
| 3,088,438 A * | 5/1963 | Oliphant | ....................... | 119/770 |
| 3,358,789 A * | 12/1967 | Laun | ............................ | 182/113 |
| 3,523,591 A * | 8/1970 | Fountain | ......................... | 182/8 |
| 4,352,409 A * | 10/1982 | Fountain | ......................... | 182/8 |
| 5,507,362 A * | 4/1996 | Krueger | ........................... | 182/3 |

* cited by examiner

*Primary Examiner*—Alvin C Chin-Shue
(74) *Attorney, Agent, or Firm*—Horst M. Kasper

(57) ABSTRACT

A strap surrounding a trunk. A support is held a strap against the trunk. A mechanical linkage is attached to the support. A brake is furnished to the mechanical linkage. A frame is attached to the linkage for maintaining a person in position. A belt attached to the frame to be wrapped around a person for preventing a falling of the person. The mechanical linkage can comprise a distance adjustment mechanics allowing a change in distance between the support and the frame. An adjustable mechanical impedance can oppose forces exerted on the mechanical linkage for effecting a change in distance between the support and the frame. The adjustable mechanical impedance can be furnished by an adjustable friction brake.

18 Claims, 15 Drawing Sheets

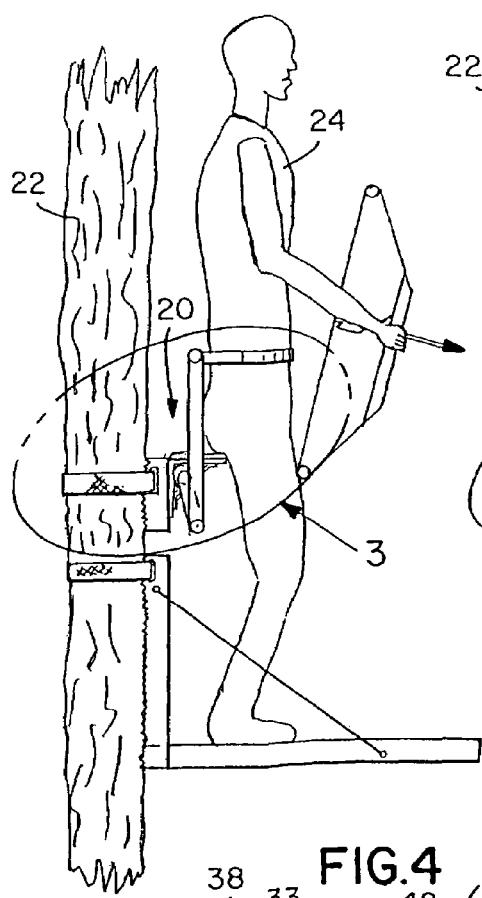
FIG.1
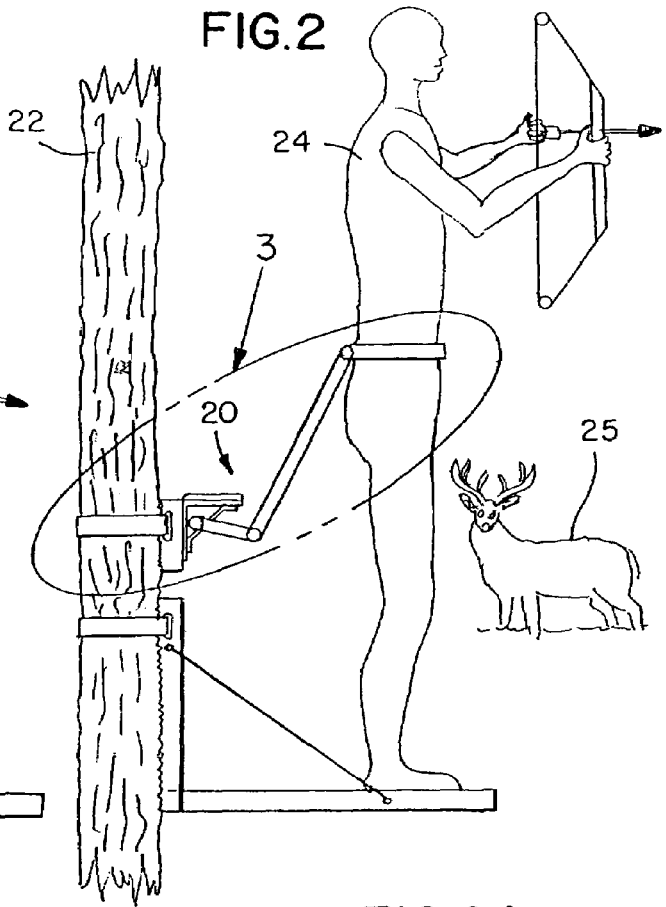
FIG.2
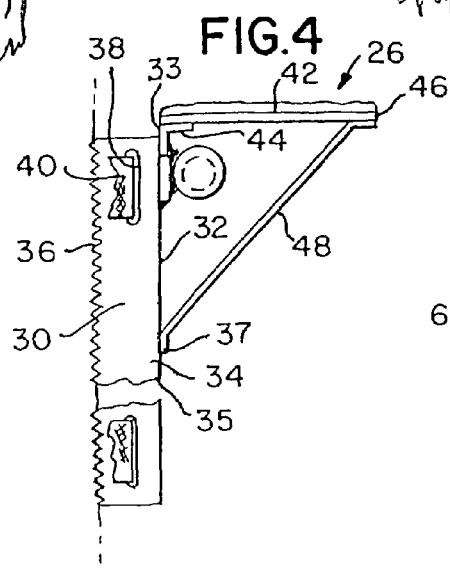
FIG.4
FIG.6A

DEVICE FOR ATTACHING TO A TREE AND STABILIZING A BOWMAN ATTACHED THERETO WHO IS HUNTING GAME

This application is a Continuation-in-part Application of the U.S. application Ser. No. 09/688,913, filed on Oct. 16, 2000 now U.S. Pat. No. 6,523,643.

BACKGROUND OF THE INVENTION

1. Field of the Invention

The present invention relates to a device for attaching to a tree. More particularly, the present invention relates to a device for attaching to a tree and stabilizing a bowman attached thereto who is hunting game.

2. Description of the Prior Art

A bow hunter will usually sit or stand at the rear of a tree stand with his back against the tree. When a deer appears, the hunter will step forward on the platform of the tree stand to ready himself for a shot. With the tree no longer at the hunter's back as a reference, the hunter could loose his sense of balance.

Numerous innovations for hunter supports have been provided in the prior art that will be described. Even though these innovations may be suitable for the specific individual purposes to which they address, however, they differ from the present Invention.

A FIRST EXAMPLE, U.S. Pat. No. 4,506,466 to Hall teaches a portable bench which is particularly suited for use by a shooter that comprises top and front and rear leg assemblies pivotally connected thereto. The leg assemblies fold inwardly to provide a pocket for carrying a seat, which is releasably connected to the leg assemblies when they are folded outwardly at the point of use. The bench top is inclined and is vertically and angularly adjustable. The bench top has a lateral recess which overlies the seat for accommodating the upper body of the shooter when seated on the seat. An adjustable gun rest is provided at the font of the bench top for supporting the forearm of the shooter's gun.

A SECOND EXAMPLE, U.S. Pat. No. 4,913,391 to Klipp teaches a gun rest and sports equipment holder for use on railings of a tree stand, fence, porch deck, or the like that includes a portable bracket with attaching clamp, a cradle for a gun rest and an optional adaptor for holding spotting telescopes and cameras is adjustable for various viewing heights and azimuth angles by the attending hunter or sportsman and serves to stabilize the aiming of long barrel firearms, spotting scopes or cameras.

A THIRD EXAMPLE, U.S. Pat. No. 5,052,514 to Rezmer teaches a safety harness especially for hunters who use tree stands. The harness comprises a web belt with a buckle for the hunter. Attached to the belt try a "D"-ring is a safety rope, which is fastened, around the three and back onto the "D"-ring by an cammed-hook assembly to secure the hunter from falling. The harness is easily portable and is usable both as a climbing harness and as a tether while the hunter is on the tree stand.

A FOURTH EXAMPLE, U.S. Pat. No. 5,481,817 to Parker teaches an adjustable firearm support for use in adjusting the eights of a firearm. The firearm support Includes a substantially horizontally disposed tube having an armrest movably attached to one end thereof and a gun cradle movably attached to an opposite end thereof. A telescopic stand is pivotally and slidably coupled to the tube by a clevis and facilitates providing vertical support for the tube. The stand, in turn, may be releasably clamped to the stationary object. The clevis is rotatably engageable with the tube so as to permit the tube to be rotated in a horizontal plane. The clevis is further pivotal so as to permit the tube to be pivoted in a vertical plane. The firearm support is not limited in its application to adjusting firearm sights but may be set up at a hunting site, and attached to a tree stand or other solid object, for use in providing a steady rest when sighting and firing a game. When not in use, the firearm support is capable of being broken down into a compact and light-weight assembly so as to be easily transported and stored.

A FIFTH EXAMPLE, U.S. Pat. No. 5,688,024 to Arizpe-Gilmore teaches a foldable rotary hunting seat, comprising a seat and a seat back articulately coupled to the seat so as to allow to be folded when folding the seat; said seat and seat back being made of a rigid material; a plate bearing centrally coupled to a lower surface of the seat; four leg sockets, equally coupled to a lower surface of the plate bearing and four legs, each loosely coupled to a leg socket, so that the seat can rotate on said plate bearing when it is assembled and placed in a hunting position; a weapon support arm articulately coupled to the seat, to maintain the weapon support arm in a hunting position and allow to be folded when folding the seat; and a variable height weapon retaining fork rotary coupled to the upper vertical end of the support arm.

It is apparent that numerous innovations for hunter supports have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a device for attaching to a tree and stabilizing a bowman attached thereto who is hunting game that avoids the disadvantages of the prior art.

ANOTHER OBJECT of the present invention is to provide a device for attaching to a tree and stabilizing a bowman attached thereto who is hunting game that is simple and Inexpensive to manufacture.

STILL ANOTHER OBJECT of the present invention is to provide a device for attaching to a tree and stabilizing a bowman attached thereto who is hunting game that is simple to use.

BRIEFLY STATED, YET ANOTHER OBJECT of the present invention is to provide a device for attaching to a tree and stabilizing a bow hunter attached thereto that includes a tree-attaching portion and a bow hunter-attaching portion. The tree-attaching and bow hunter-attaching portions each include an intermediate tube a pair of intermediate bushings, a pair of outboard tubes, two pair of outboard bushings, a pair of intermediate friction washers, a tube, two pair of outboard washers, a rod, first and second knobs, a thrust bearing, and a pair of arms. The tree-attaching portion further includes a tree mount and a seat for sitting upon by the bow hunter while leaning on the tree and waiting for the game to appear. The bow hunter-attaching portion further includes a cross arm, a block, a shaft, a nut, a washer, a sleeve, a cable, and a belt. The belt includes a pair of sleeves, a pair of rubber tubes, a pair of throughbores, and eyelets. The cable extends along the outermost surface of the belt until the ends thereof reach an innermost pair of the throughbores in the belt, at which time, the ends of the cable pass therein and out an outermost pair of the throughbores in the belt, and are maintained thereat, by collars that are fixedly attached to the ends of the cable so as to allow the cable to move with the belt for allowing the bow hunter to turn right and left by virtue of the cable moving in the sleeve of the bow hunter-attaching portion.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic side elevational view of the present invention in use with a bowman seating thereon and stabilized thereby;

FIG. 2 is a diagrammatic side elevational view of the present invention in use with a bowman not seating thereon, but stabilized thereby;

FIG. 4 is an enlarged diagrammatic side elevational view taken generally in the direction of arrow 4 in FIG. 3 of the seat of the tree-attaching portion of the present invention;

FIG. 6A is an enlarged diagrammatic perspective view of the area generally enclosed by the dotted curves identified by arrow 6A in FIG. 3 of the pivot Joint of the tree attaching portion and the user-attaching portion of the present invention;

Figure 3:
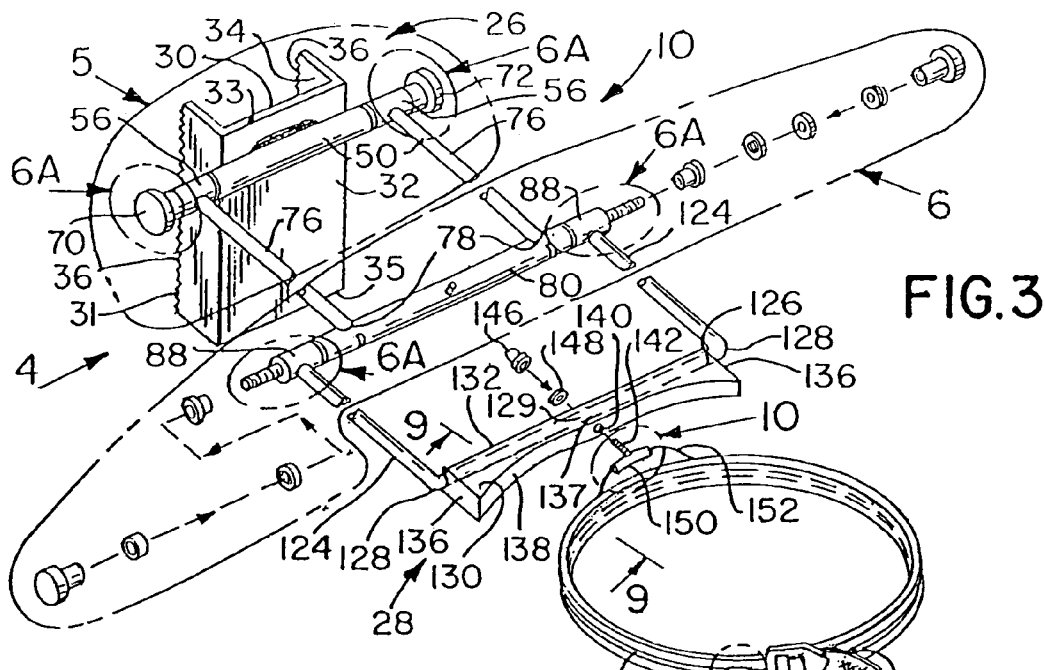
FIG. 3 is an enlarged diagrammatic perspective view, partially exploded, of the present invention shown in FIGS. 1 and 2.
Figure 5:
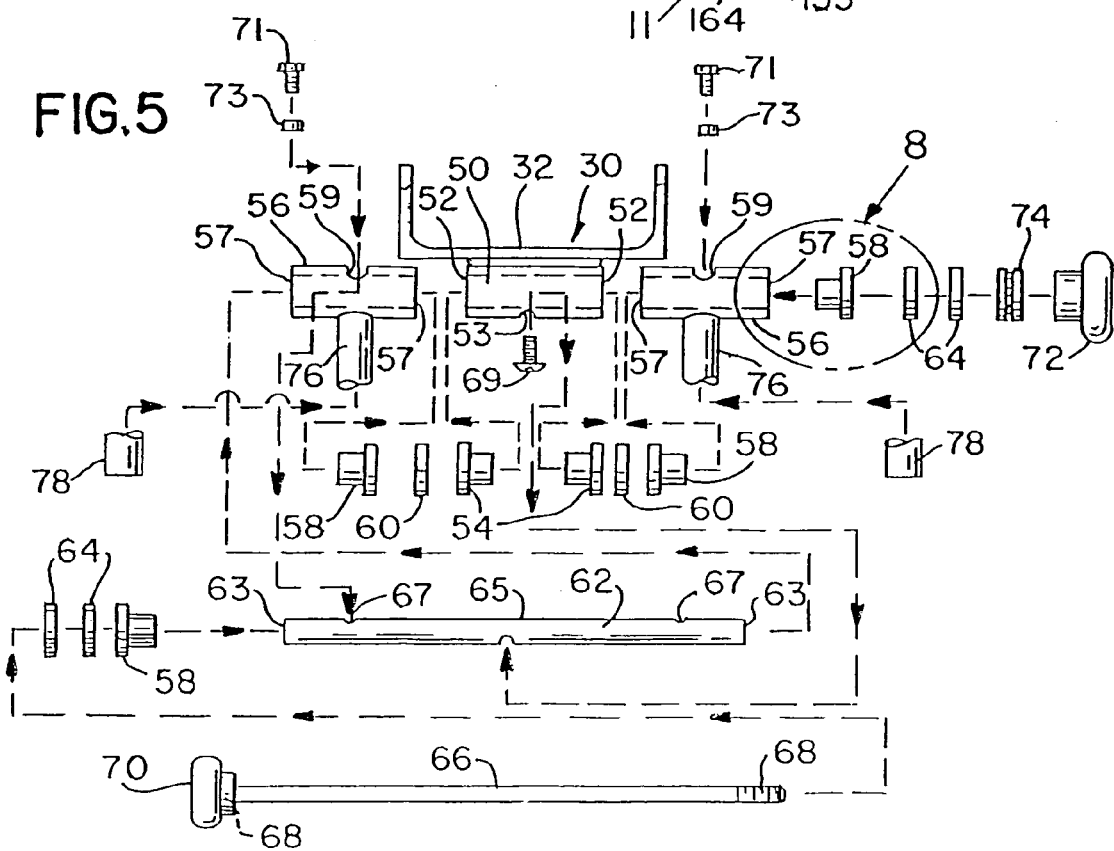
FIG. 5 is an enlarged exploded diagrammatic top plan view of the area generally enclosed by the dotted curve identified by arrow 5 in FIG. 3 of the tree-attaching portion of the present invention.
Figure 6:
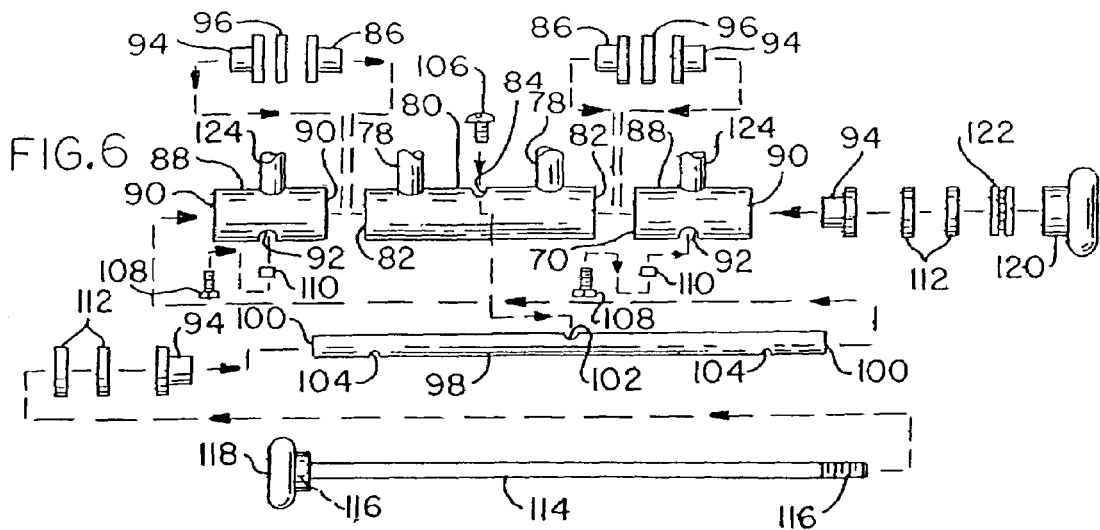
FIG. 6 is an enlarged exploded diagrammatic top plan view of the area generally enclosed by the dotted curve identified by arrow 6 in FIG. 3 of the user-attaching portion of the present invention.
Figure 7:
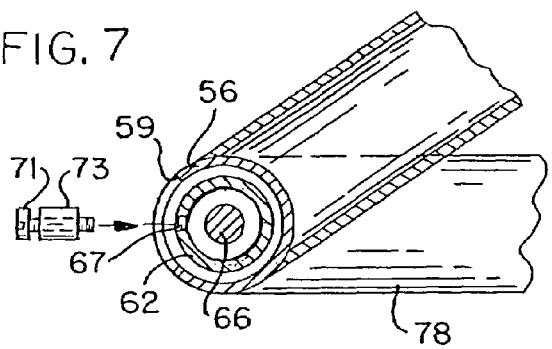
FIG. 7 is an enlarged diagrammatic cross sectional view, taken on line 7-7 in FIG. 6A of the lock of the pivot Joint of the tree-attaching portion and the user-attaching portion of the present invention.
Figure 8:
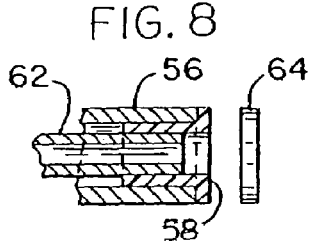
FIG. 8 is an enlarged diagrammatic cross sectional view taken on line 8-8 in FIG. 6.
Figure 9:
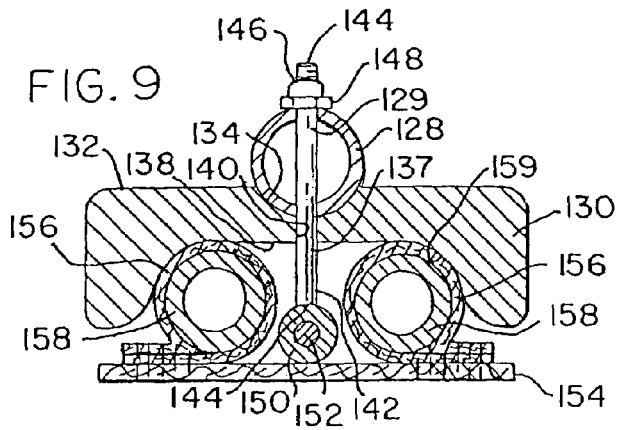
FIG. 9 is an enlarged diagrammatic cross sectional view taken on line 9-9 in FIG. 3 of a portion of the harness joint of the user-attaching portion of the present invention.
Figure 10:
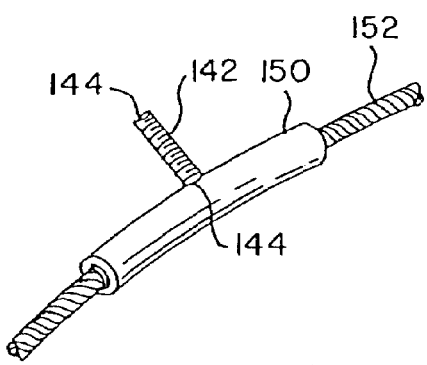
FIG. 10 is an enlarged diagrammatic perspective view of the area generally enclosed by the dotted curve identified by arrow 10 in FIG. 3 of a remaining portion of the harness joint of the user-attaching portion of the present invention.
Figure 11:
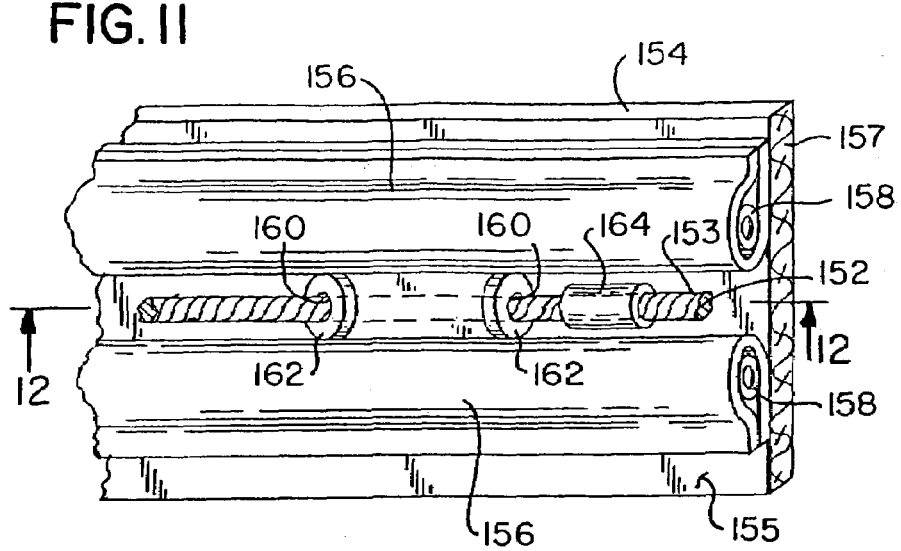
FIG. 11 is an enlarged diagrammatic perspective view of the area generally enclosed by the dotted curve identified by arrow 11 in FIG. 3 of a portion of the harness of the user-attaching portion of the present invention.
Figure 12:
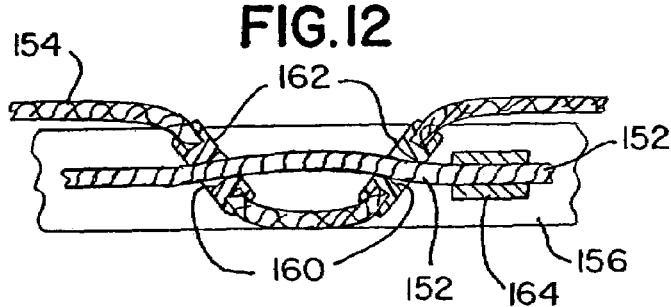
FIG. 12 is an enlarged diagrammatic cross sectional view taken on line 12-12 in FIG. 11 of the cable of the harness of the user-attaching portion of the present invention.

LIST OF REFERENCE NUMERALS UTILIZED IN THE DRAWING 20 device of present invention for attaching to tree 22 and stabilizing bow hunter 24 attached thereto who is hunting game 25
22 tree
24 bow hunter
25 game
26 tree-attaching portion for attaching to tree 22
28 bow hunter-attaching portion for attaching to bow hunter 24
30 tree mount of tree-attaching portion 26
32 web of tree mount 30 of tree-attaching portion 26
33 upper extreme of web 32 of tree mount 30 of tree-attaching portion 26
34 pair of flanges of tree mount 30 of tree-attaching portion 26
35 lower extreme of web 32 of tree mount 30 of tree-attaching portion 26
36 pair of free edges of pair of flanges 34 of tree mount 30 of tree-attaching portion 26, respectively
37 intermediate point of web 32 of tree mount 30 of tree-attaching portion 26
38 at least one throughslot in each flange of pair of flanges 34 of tree mount 30 of tree-attaching portion 26
40 at least one strap of tree mount 30 of tree-attaching portion 26 for encircling, and replaceably affixing tree mount 30 to, tree 22
42 seat of tree mount 30 of tree-attaching portion 26 for sitting upon by bow hunter 25 while leaning against tree 22 and waiting for game 25 to appear
44 angle iron of seat 42 of tree mount 30 of tree-attaching portion 26
46 free edge of seat 42 of tree mount 30 of tree-attaching portion 26
48 pair of braces of tree mount 30 of tree-attaching portion 26

50 intermediate tube of tree-attaching portion 26
52 pair of ends of intermediate tube 50 of tree-attaching portion 26
53 threaded blindbore in intermediate tube 50 of tree-attaching portion 26
54 pair of intermediate bushings of tree-attaching portion 26
56 pair of outboard tubes of tree-attaching portion 26
57 pair of ends of each outboard tube of pair of outboard tubes 56 of tree-attaching portion 26
58 two pair of outboard bushings of tree-attaching portion 26
59 slot in each outboard tube of pair of outboard tubes 56 of tree-attaching portion 26
60 pair of intermediate friction washers of tree-attaching portion 26
62 tube of tree-attaching portion 26
63 pair of ends of tube 62
64 two pair of outboard washers of tree-attaching portion 26
65 threaded intermediate blindbore in tube 62 in tree-attaching portion 26
66 rod of tree-attaching portion 26
67 pair of threaded outboard blindbores in tube 62 in tree-attaching portion 26
68 pair of ends of rod 66 of tree-attaching portion 26
69 intermediate screw of tree-attaching portion 26
70 first knob of tree-attaching portion 26
71 pair of stop screws of tree-attaching portion 26
72 second knob of tree-attaching portion 26
73 pair of resilient sleeves of tree-attaching portion 26 for preventing noise from occurring when pair of stop screws 71 of tree-attaching portion 26 engage extremes of slot 59 in each outboard tube of pair of outboard tubes 56 of tree-attaching portion 26 that would scare away game 25
74 thrust bearing of tree-attaching portion 26 for facilitating rotation of second knob 72 of tree-attaching portion 26 relative to first knob 70 of tree-attaching portion 26 by avoiding friction
76 pair of arms of tree-attaching portion 26
78 ends of pair of arms 76 of tree-attaching portion 26
80 intermediate tube of bow hunter-attaching portion 28
82 pair of ends of intermediate tube 80 of bow hunter-attaching portion 28
84 blindbore in intermediate tube 80 of bow hunter-attaching portion 28
86 pair of intermediate bushings of bow hunter-attaching portion 28
88 pair of outboard tubes of bow hunter-attaching portion 28
90 pair of ends of each outboard tube of pair of outboard tubes 88 of bow hunter-attaching portion 28
92 slot in each outboard tube of pair of outboard tubes 88 of bow hunter-attaching portion 28
94 two pair of outboard bushings of bow hunter-attaching portion 28
96 pair of intermediate friction washers of bow hunter-attaching portion 28
98 tube of bow hunter-attaching portion 28
100 pair of ends of tube 98 of bow hunter-attaching portion 28
102 threaded intermediate blindbore in tube 98 of bow hunter-attaching portion 28
104 pair of threaded outboard blindbores in tube 98 of bow hunter-attaching portion 28
106 intermediate screw of bow hunter-attaching portion 28
108 pair of stop screws of bow hunter-attaching portion 28
110 pair of resilient sleeves of bow hunter-attaching portion 28 for preventing noise from occurring when pair of stop screws 108 of bow hunter-attaching portion 28 engage extremes of slot 92 in each outboard tube of pair of outboard tubes 88 of bow hunter-attaching portion 28 that would scare away game 25
112 two pair of outboard washers of bow hunter-attaching-portion 28
114 rod of bow hunter-attaching portion 28
116 pair of ends of rod 114 of bow hunter—attaching portion 28
118 first knob of bow hunter-attaching portion 28
120 second knob of bow hunter-attaching portion 28
122 thrust bearing of bow hunter-attaching portion 28 for facilitating rotation of second knob 120 of bow hunter-attaching portion 28 relative to first knob 118 of bow hunter-attaching portion 28 by avoiding friction
124 pair of arms of bow hunter-attaching portion 28
126 ends of pair of arms 124 of bow hunter-attaching portion 28
128 cross arm of bow hunter-attaching portion 28
129 throughbore extending centrally through cross arm 128 of bow hunter-attaching portion 28
130 block of bow hunter-attaching portion 28
132 rearwardmost surface of block 130 of bow hunter-attaching portion 28
134 groove extending centrally and longitudinally in rearwardmost surface 132 of block 130 of bow hunter-attaching portion 28
136 pair of ends of block 130 of bow hunter-attaching portion 28
137 midpoint of block 130 of bow hunter-attaching portion 28
138 forwardmost surface of block 130 of bow hunter-attaching portion 28 for generally conforming to waist of bow hunter 24
140 throughbore in block 130 of bow hunter-attaching portion 28
142 shaft of bow hunter-attaching portion 28
144 pair of ends of shaft 142 of bow hunter-attaching portion 28.
146 nut of bow hunter-attaching portion 28
148 washer of bow hunter-attaching portion 28
150 sleeve of bow hunter-attaching portion 28
152 cable of bow hunter-attaching portion 28
153 pair of ends of cable 152 of bow hunter-attaching portion 28
154 belt of bow hunter-attaching portion 28 for encircling waist of bow hunter 24
155 outermost surface of belt 154 of bow hunter-attaching portion 28
156 pair of sleeves of belt 154 of bow hunter-attaching portion 28
157 pair of ends of belt 154 of bow hunter-attaching portion 28
158 pair of rubber tubes of belt 154 of bow hunter-attaching portion 28
159 conforming track in forwardmost surface 132 of block 130 of bow hunter-attaching portion 28
160 two pair of throughbores in belt 154 of bow hunter-attaching portion 28
162 eyelets in belt 154 of bow hunter-attaching portion 28
collars of bow hunter-attaching portion 28.
164 collars of bow-hunter attaching portion 28

Second Embodiment 220 device of present invention for attaching to tree 22 and stabilizing bow hunter 24 attached thereto who is hunting game 25

226 tree-attaching portion
230 tree mount of tree-attaching portion 226
234 pair of flanges of tree mount 230 of tree-attaching portion 226
238 two throughslots in each flange of pair of flanges 234 of tree mount 230 of tree-attaching portion 226, respectively
240 two straps of tree mount 230 of tree-attaching portion 226 for better holding tree mount 230 of tree-attaching portion 226 to tree 22

Third Embodiment 320 device of present invention for attaching to tree 22 and stabilizing bow hunter 24 attached thereto who is hunting game 25
326 tree-attaching portion
364 tree stand for engaging tree 22 and having bow hunter 24 stand thereon
366 tree mount of tree stand 364
367 upper extreme of tree mount 366 of tree stand 364
368 lower extreme of tree mount 366 of tree stand 364
370 platform of tree stand 364 for having bow hunter 24 stand thereon
372 free edge of platform 370 of tree stand 364
374 pair of braces of tree stand 364.

DETAILED DESCRIPTION OF THE PREFERRED EMBODIMENT

Referring now to the figures, in which like numerals indicate like parts, and particularly to FIGS. 1 and 2, the device of the present invention is shown generally at 20 for attaching to a tree 22 and stabilizing a bow hunter 24 attached thereto who is hunting game 25.

The overall configuration of the device 20 can best be seen in FIG. 3, and a such, will be discussed with reference thereto.

The device 20 comprises a tree-attaching portion 26 for attaching to the tree 22 and a bow hunter-attaching portion 28 that is operatively connected to the tree-attaching portion 26 for attaching to the bow hunter 24.

The specific configuration of the tree-attaching portion 26 can best be seen in FIGS. 3-5, 6A, 7, and 8, and as such, will be discussed with reference thereto.

The tree-attaching portion 26 comprises a tree mount 30 that is vertically-oriented and channel shaped; and as a result thereof, has a web 32 with an upper extreme 33, a lower extreme 35, and an intermediate point 37 which is intermediate the upper extreme 33 thereof and the lower extreme 35 thereof, and a pair of flanges 34 that extend rearwardly from the web 32 thereof to a pair of free edges 36, respectively.

The pair of free edges 36 of the pair of flanges 34 of the tree mount 30 are serrated for biting into, and providing a better grip to, the tree 22.

Each flange 34 of the tree mount 30 has at least one throughslot 38 that extends vertically and aligningly therethrough.

The tree mount 30 further comprises at least one strap 40 that extends through the throughslot 38 in each flanges 34 thereof for encircling, and replaceably affixing the tree mount 30 to, the tree 22.

The tree mount 30 further comprises a seat 42 that is horizontally-oriented and extends forwardly from, and is affixed by an angle iron 44 to, the upper extreme 33 of the web 32 thereof, to a free edge 46 for sitting upon by the bow hunter 25 while leaning against the tree 22 and waiting for the game 25 to appear.

The tree mount 30 further comprises a pair of braces 48 that extend incliningly upwardly forwardly from the intermediate point 37 of the web 32 thereof to the free edge 46 of the seat 42 thereof, and are in alignment with the pair of flanges 34 thereof.

The tree-attaching portion 26 further comprises an intermediate tube 50 that is horizontally-oriented and affixed to, with a length shorter than, the web 32 of the tree mount 30, is disposed just below the angle iron 44 of the tree mount 30, and has a pair of ends 52 thereof and a blindbore 53 that is midway between the pair of ends 52 thereof and is disposed farthest away from the web 32 of the tree mount 30.

The tree-attaching portion 26 further comprises a pair of intermediate bushings 54 that extend fixedly into the pair of ends 52 of the intermediate tube 50 thereof, respectively.

The tree-attaching portion 26 further comprises a pair of outboard tubes 56 that coaxially straddle, and are rotatably connected to, the intermediate tube 50 thereof, each of which having a pair of ends 57 and a slot 59 that faces the web 32 of the tree mount 30, extends vertically midway between the pair of ends 57 thereof, and has extremes that determine limits of rotation.

The tree-attaching portion 26 further comprises a pair of outboard bushings 58 that extend fixedly into the pair of ends 57 of each outboard tube 56 thereof, respectively.

The tree-attaching portion 26 further comprises a pair of intermediate friction washers 60, each which is disposed between an intermediate bushing 54 thereof and an adjacent outboard bushing 58 thereof.

The tree-attaching portion 26 further comprises a tube 62 that is slender, elongated, and extends through the intermediate tube 50 thereof, the pair of intermediate bushings 54 thereof, the pair of outboard tubes 56 thereof, the two pair of outboard bushings 58 thereof, and the pair of intermediate washers 60 thereof, and has a pair of ends 63.

The tube 62 of the tree-attaching portion 26 further has a threaded intermediate blindbore 65 that is midway between the pair of ends 63 thereof and which aligns with the threaded blindbore 53 in the intermediate tube 50 thereof.

The tube 62 of the tree-attaching portion 26 further has a pair of threaded outboard blindbores 67 that are disposed in proximity to the pair of ends 63 thereof, opposite to the threaded intermediate blindbore 65 therein.

The tree-attaching portion 26 further comprises an intermediate screw 69 that passes freely into the blindbore 53 in the intermediate tube 50 thereof and threadably into the threaded intermediate blindbore 65 in the tube 62 thereof so as to prevent rotation of the tube 62 thereof in the intermediate tube 50 thereof.

The tree-attaching portion 26 further comprises a pair of stop screws 71 that pass freely into the slot 59 in each outboard tube 56 thereof and threadably into the pair of threaded outboard blindbores 67 in the tube 62 thereof, respectively, and provide stops for rotation of the pair of outboard tubes 56 thereof relative to the tube 62 thereof.

The tree-attaching portion 26 further comprises a pair of resilient sleeves 73 that receive the pair of stop screws 71 thereof and ride in the slot 59 in each outboard tube 56 thereof for preventing a noise from occurring when the pair of stop screws 71 thereof engage the extremes of the slot 59 in each outboard tube 56 thereof that would scare away the game 25.

The tree-attaching portion 26 further comprises two pair of outboard washers 64, each pair of which abuts against the outermost bushing 58 of each outboard tube 56 thereof, wherein an innermost pair thereof are friction washers.

The tree-attaching portion 26 further comprises a rod 66 that extends rotatably through the tube 62 thereof, and has a pair of the ends 68 that extend past the two pair of outboard washers 64 thereof.

The tree attaching portion further comprises a first knob 70 that is fixedly attached to, for rotation with, one end 68 of the rod 66 thereof, wherein the other end 68 of the rod 66 thereof is threaded.

The tree-attaching portion 26 further comprises a second knob 72 which threadably engages the other end 68 of the rod 66 thereof, and whose rotation determines amount of tension between the pair of outboard tubes 56 thereof and the intermediate tube 50 thereof for relative pivoting by virtue of amount of compressibility applied to the friction washers.

The tree-attaching portion 26 further comprises a thrust bearing 74 that has the other end 68 of the rod 66 thereof pass therethrough, and is disposed adjacently between the second knob 72 thereof and an adjacent outboard washer 64 thereof for facilitating rotation of the second knob 72 thereof relative to the first knob 70 thereof by avoiding friction.

The tree-attaching portion 26 further comprises a pair of arms 76 that are parallel to each other, slender, elongated, and extend perpendicularly outwardly from the pair of outboard tubes 56 thereof, respectively, directly opposite to the slot 59 in each outboard tube 56 thereof, to ends 78.

The specific configuration of the bow hunter-attaching portion 28 can best be seen in FIGS. 3, 6, and 9-12, anal as such, will be discussed with reference thereto.

The bow hunter-attaching portion 28 comprises an intermediate tube 80 that is horizontally-oriented and affixed to the ends 78 of the pair of arms 76 of the tree-attaching portion 26, and is disposed parallel to the intermediate tube 50 of the tree-attaching portion 26.

The intermediate tube 80 of the bow hunter-attaching portion 28 has a pair of ends 82 that align with an outermost end 57 of each outboard tube 56 of the tree-attaching portion 26, respectively, and a blindbore 84 that is midway between the pair of ends 82 thereof and is disposed between the pair of arms 76 of the tree-attaching portion 26.

The bow hunter-attaching portion 28 further comprises a pair of intermediate bushings 86 that extend fixedly into the pair of ends 82 of the intermediate tube 80 thereof, respectively.

The bow hunter-attaching portion 28 further comprises a pair of outboard tubes 88 that coaxially straddle, and are rotatably connected to, the intermediate tube 80 thereof, each of which having a pair of ends 90 and a slot 92 that extends vertically midway between the pair of ends 90 thereof, and has extremes that determine limits of rotation.

The bow hunter-attaching portion 28 further comprises a pair of outboard bushings 94 that extend fixedly into the pair of ends 90 of each outboard tube 88 thereof, respectively.

The bow hunter-attaching portion 28 further comprises a pair of intermediate friction washers 96, each which is disposed between an intermediate bushing 86 thereof and an adjacent outboard bushing 94 thereof.

The bow hunter-attaching portion 28 further comprises a tube 98 that is slender, elongated, and extends through the intermediate tube 80 thereof, the pair of intermediate bushings 86 thereof, the pair of outboard tubes 88 thereof, the two pair of outboard bushings 94 thereof, and the pair of intermediate washers 96 thereof, and has a pair of ends 100.

The tube 98 of the bow hunter-attaching portion 28 further has a threaded intermediate blindbore 102 that is midway between the pair of ends 100 thereof and which aligns with the blindbore 84 in the intermediate tube 80 thereof.

The tube 98 of the bow hunter-attaching portion 28 further has a pair of threaded outboard blindbores 104 that are disposed in proximity to the pair of ends 100 thereof, opposite to the threaded intermediate blindbore 102 therein.

The bow hunter-attaching portion 28 further comprises an intermediate screw 106 that passes freely into the blindbore 84 in the intermediate tube 80 thereof and threadably into the threaded intermediate blindbore 102 in the tube 98 thereof so as to prevent rotation of the tube 98 thereof in the intermediate tube 80 thereof.

The bow hunter-attaching portion 28 further comprises a pair of stop screws 108 that pass freely into the slot 92 in each outboard tube 88 thereof and threadably into the pair of threaded outboard blindbores 104 in the tube 98 thereof, respectively, and provide stops for rotation of the pair of outboard tubes 88 thereof relative to the tube 98 thereof.

The bow hunter-attaching portion 28 further comprises a pair of resilient sleeves 110 that receive the pair of stop screws 108 thereof and ride in the slot 92 in each outboard tube 88 thereof for preventing a noise from occurring when the pair of stop screws 108 thereof engage the extremes of the slot 92 in each outboard tube 88 thereof that would scare away the game 25.

The bow hunter-attaching portion 28 further comprises two pair of outboard washers 112, each pair of which abuts against the outermost bushing 94 of each outboard tube 88 thereof, wherein an innermost pair thereof are friction washers.

The bow hunter-attaching portion 28 further comprises a rod 114 that extends rotatably through the tube 98 thereof, and has a pair of ends 116 that extend past the two pair of outboard washers 112 thereof.

The bow hunter-attaching portion 28 further comprises a first knob 118 that is fixedly attached to, for rotation with, one end 116 of the rod 114 thereof, wherein the other end 116 of the rod 114 thereof is threaded.

The bow hunter-attaching portion 28 further comprises a second knob 120 which threadably engages the other end 116 of the rod 114 thereof, and whose rotation determines amount of tension between the pair of outboard tubes 88 thereof and the intermediate tube 80 thereof for relative pivoting by virtue of amount of compressibility applied to the friction washers.

The bow hunter-attaching portion 28 further comprises a thrust bearing 122 that has the other and 116 of the rod 114 thereof pass therethrough, and is disposed adjacently between the second knob 120 thereof and an adjacent outboard washer 112 thereof for, facilitating rotation of the second knob 120 thereof relative to the first knob 118 thereof by avoiding friction.

The bow hunter-attaching portion 28 further comprises a pair of arms 124 that are parallel to each other, slender, elongated, and extend perpendicularly outwardly from the pair of outboard tubes 88 thereof, respectively, directly opposite to the slot 92 in each outboard tube 88 thereof, to ends 126.

The bow hunter-attaching portion 28 further comprises a cross arm 128 that is slender, elongated, and extends transversely and rotationally from the end 126 of one arm 124 thereof to the end 126 of the other arm 124 thereof, is disposed parallel to the intermediate tube 80 thereof, and has a throughbore 129 that extends centrally therethrough, in line with the pair of arms 124 thereof.

The bow hunter-attaching portion 28 further comprises a block 130 that extends along, and rotates with, the cross arm 128, and is disposed farthest away from the intermediate tube 80 thereof.

The block 130 has a rearwardmost surface 132 that is flat with a groove 134 that extends centrally and longitudinally therein and which conforms to, and receives, the cross arm 128, a pair of end 136, a midpoint 137 that is midway between the pair of ends 136 thereof, a forwardmost surface 138 that extends concavely from one end 136 thereof to the other end 136 thereof for generally conforming to the waist of the bow hunter 24, and a throughbore 140 that extends through the midpoint 137 thereof, from the forwardmost surface 138 thereof to the rearwardmost surface 132 thereof.

The bow hunter-attaching portion 28 further comprises a shaft 142 that extends in the throughbore 140 in the block 130 and in the throughbore 129 in the cross arm 128, and has a pair of ends 144.

The bow hunter-attaching portion 28 further comprises a nut 146 that threadably engages one end 144 of the shaft 142, adjacent the cross arm 128, and captures a washer 148 there between.

The bow hunter-attaching portion 28 further comprises a sleeve 150 that extends perpendicularly across the other end 144 of the shaft 142, forms a T-shape therewith, and is disposed outboard of the forwardmost surface 132 of the block 130.

The bow hunter-attaching portion 28 further comprises a cable 152 that extends movably through the sleeve 150, and has a pair of ends 153.

The bow hunter-attaching portion 28 further comprises a belt 154 for, encircling the waist of the bow hunter 24, and which is operatively connected to the cable 152, and has an outermost surface 155 and a pair of ends 157.

The belt 154 further has a pair of sleeves 156 formed from material folded unto itself that extend longitudinally along the outermost surface 155 thereof, straddle, and form a track for, the cable 152, and ride in a conforming track 159 in the forwardmost surface 132 of the block 130 when the belt 154 moves relative thereto.

The belt 154 further has a pair of rubber tubes 158 that extend through, and add rigid flexibility to, the pair of sleeves 156.

The belt 154 further has a pair of throughbores 160 that are disposed in proximity to each end 157 thereof, and are longitudinally aligned.

The belt 154 further has eyelets 162 that reinforce the two pair of throughbores 160 therein.

The cable 152 extends along the outermost surface 15.5 of the belt 154 until the ends 153 thereof reach an innermost pair of the throughbores 160 in the belt 154, at which time, the ends 153 thereof pass therein and out an outermost pair of the throughbores 160 in the belt 154, and are maintained thereat by collars 164 that are fixedly attached to the ends 153 of the cable 152 so as to allow the cable 152 to move with the belt 154 for allowing the bow hunter 24 to turn right and left by virtue of the cable 152 moving in the sleeve 150.

Figure 13:
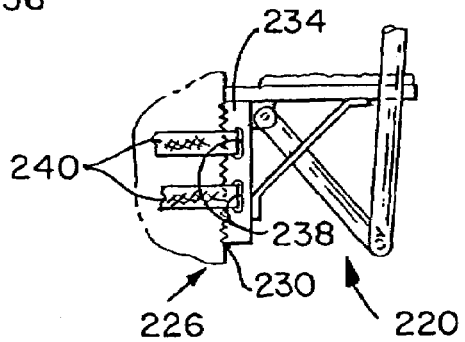
FIG. 13 is a diagrammatic side elevational view of a second embodiment of the tree mount of the tree-attaching portion of the present invention.

As shown in FIG. 13, the at least one throughslot 38 in each flange 34 of the tree mount 30 of the device 220 can be two throughslots 238 that are vertically aligned, and accordingly, the at least one strap 40 is two straps 240 for better holding the tree mount 230 to the tree 22.

Figure 14:
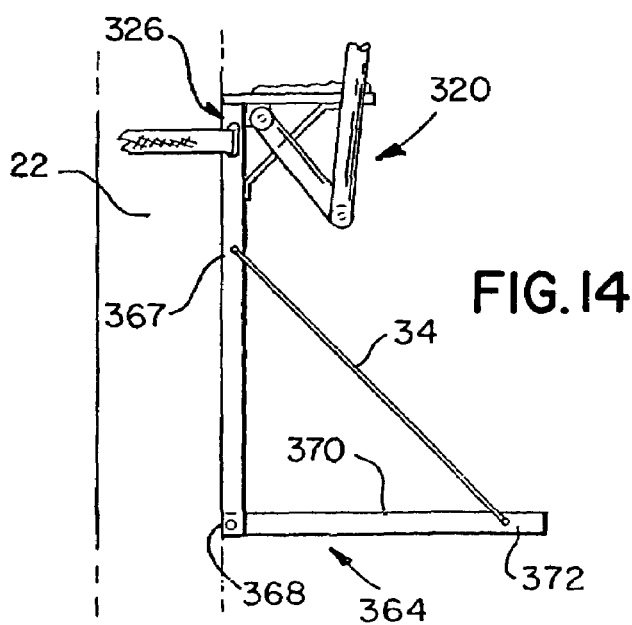
FIG. 14 is a diagrammatic side elevational view of a second embodiment of the present invention.

As shown in FIG. 14, the device 320 further comprises a tree stand 364 that is integrally formed with the tree-attaching portion 326 for engaging the tree 22 and having the bow hunter 24 stand thereon.

The tree stand 364 comprises a tree mount 366 that is vertically oriented and channel shaped, and depends, from an upper extreme 367 thereof, integrally from the lower extreme 35 of, and is wide as and as deep as, the tree mount 30 of the tree-attaching portion 26, to a lower extreme 368 thereof.

The tree stand 364 further comprises a platform 370 that is flat and extends pivotally forwardly from the lower extreme 368 of the tree mount 366 thereof, to a free edge 372 for having the bow hunter 24 stand thereon.

The tree stand 364 further comprises a pair of braces 374 that extend from the upper extreme 367 of the tree mount 366 thereof diagonally to the free edge 372 of the platform 370 thereof.

Figure 15:
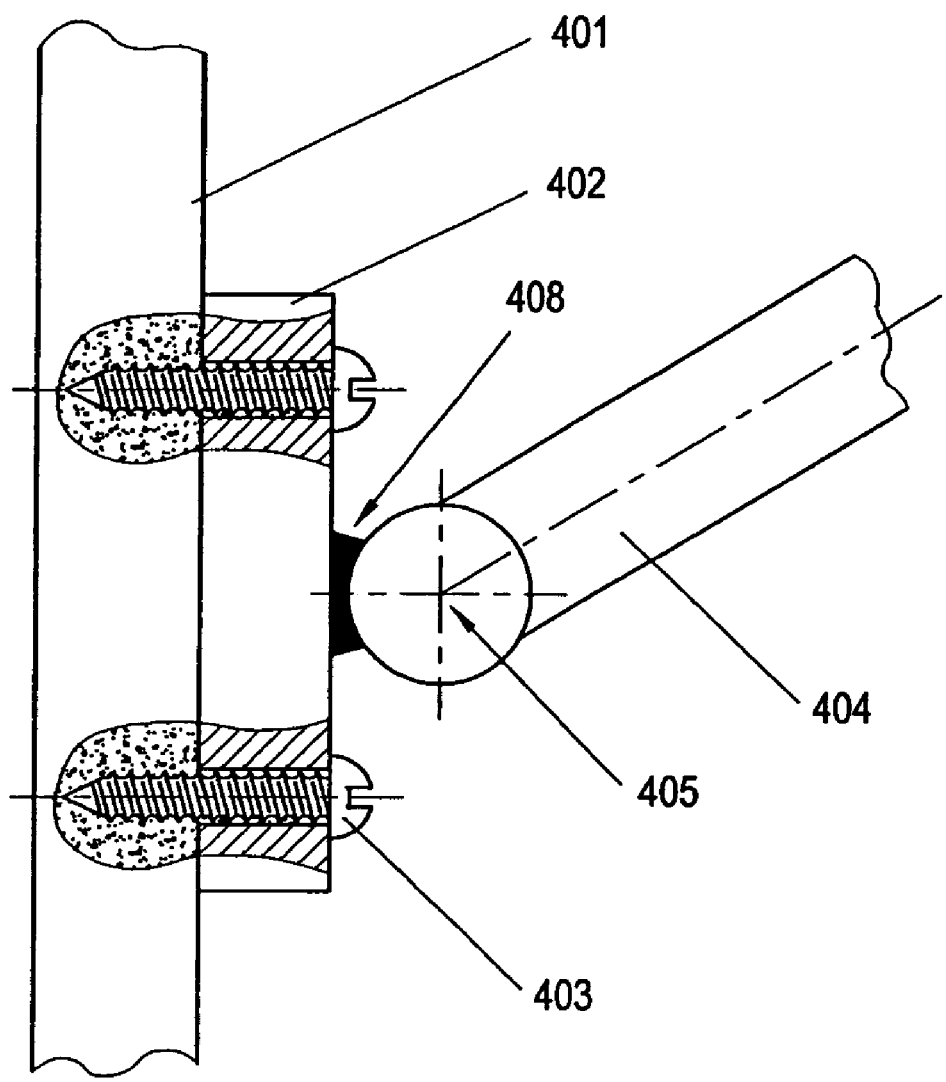
FIG. 15 is a sectional view of a stabilizing arm with a mounting plate.

FIG. 15 shows the stabilizing arm 404 attached to a mounting plate 401, wherein the mounting plate 401 can be attached to any structure such as for example the wall 401. The mounting plate 402 is attached with screws 403 to the wall 401. The stabilizing arm 404 at a first end can rotate around an axis 405, wherein the axis 405 is fixedly attached to the mounting plate 402 by a weld 408.

Figure 16:
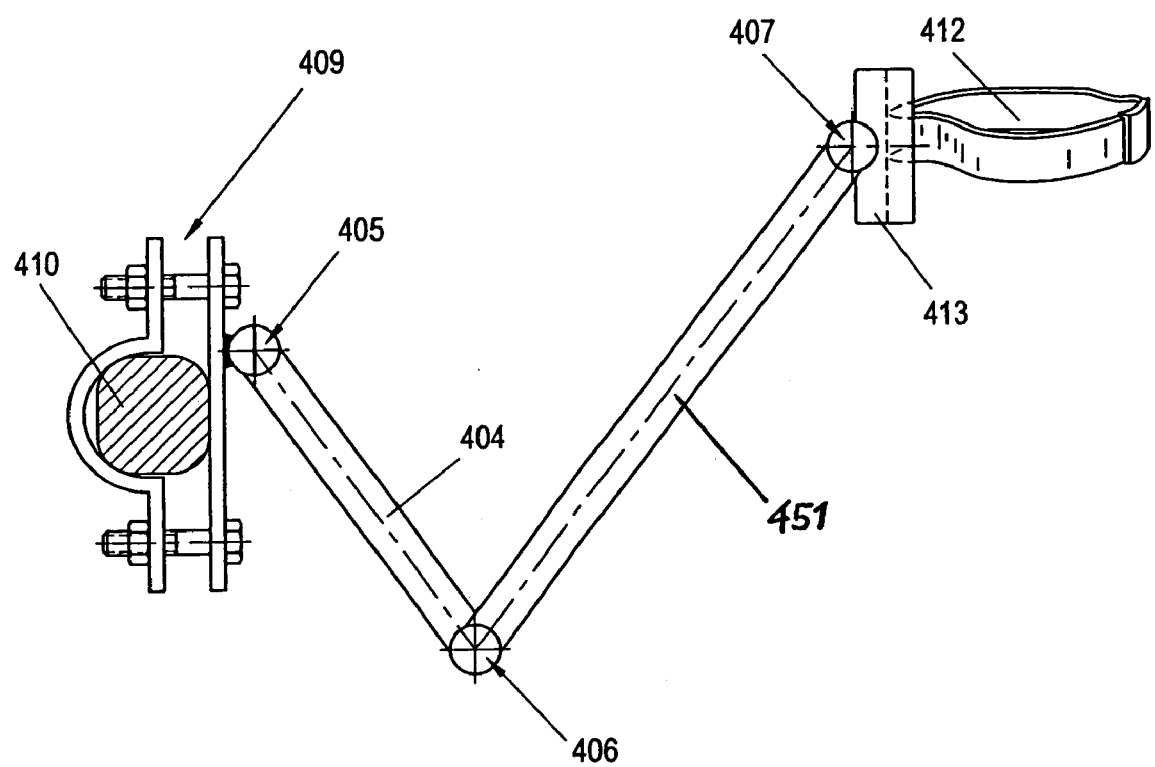
FIG. 16 is a side elevational and in part sectional view of a stabilizing arm without a seat.

FIG. 16 shows a stabilizing arm 404 without a seat for a workman. A clamp 409 is furnished attached to the axis 405 for clamping to a step or a ladder rung 410 of a ladder. The stabilizing arm 404 rotates around the axis 405. A first end of a connecting arm 451 is hingedly connected to a second end of the stabilizing arm 404 to allow for rotation of the connecting arm 451 around the second end of the stabilizing arm 404. A second end of the connecting arm 451 is hingedly attached around rotation axis 407 to the brace 413 supporting the belt 412.

Figure 17:
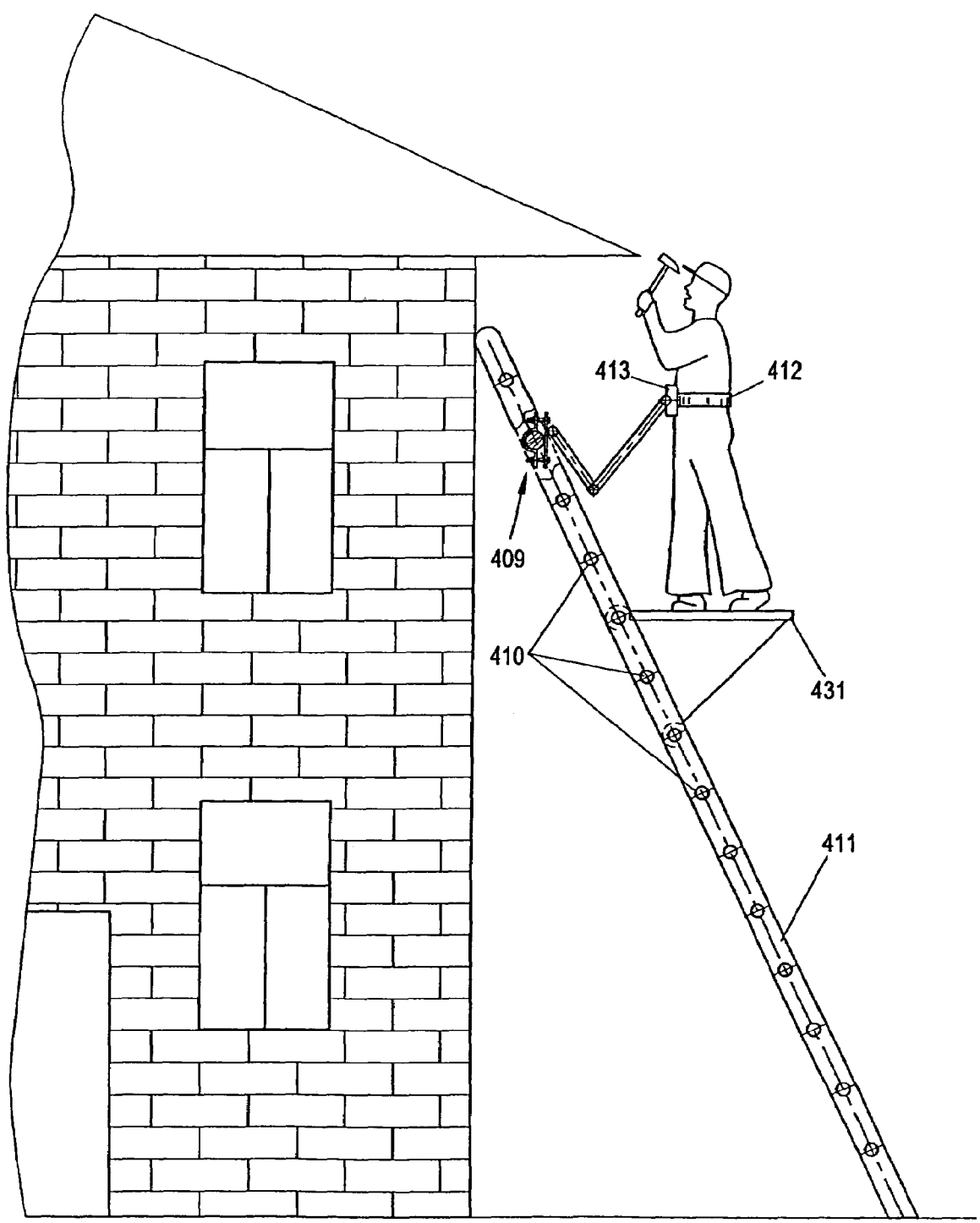
FIG. 17 is a side elevational view of a stabilizing arm securing a construction workman.

FIG. 17 shows the use of the stabilizing system for a workman standing on a ladder 411. The stabilizing arm 404 is attached to a rung 410 of the ladder 411 with the attaching bracket 409. A standing support platform 431 is attached to the ladder 411 to support the feet of the workman.

Figure 18:
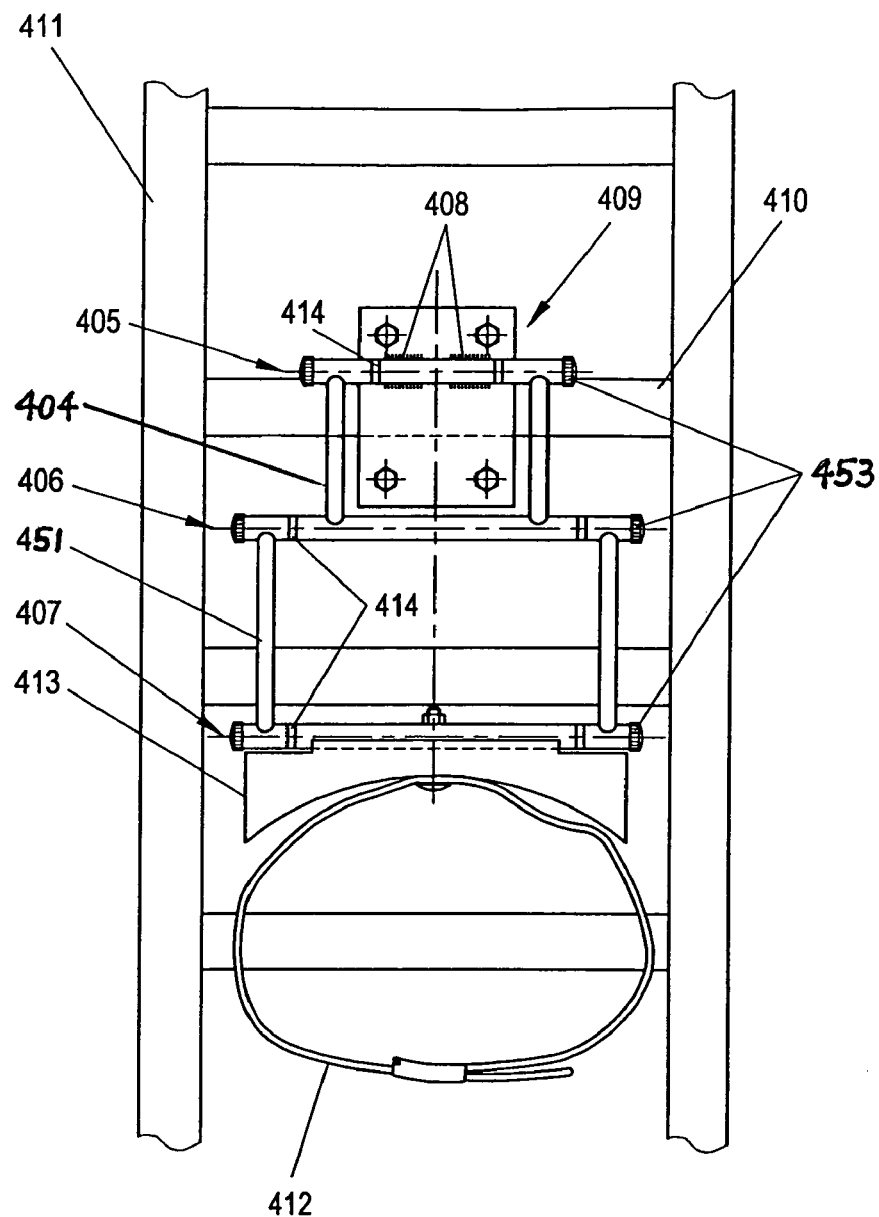
FIG. 18 is a top planar view of the stabilizing arm of FIG. 17.

FIG. 18 shows an attachment of the stabilizing system for a workman to a ladder 411. The attachment to a rung 410 of the ladder 411 is performed through mounting plate 409. Friction washers 414 are furnished for the rotation axis 405 between stabilizing arm 404 and a tube attached to the mounting plate 409 by welds 408, for rotation axis 406 between stabilizing arm 404 and connecting arm 451 and for rotation axis 407 between connecting arm 451 and brace 413. Tension adjusting knobs 453 are furnished at the ends of tubular parts attached to the stabilizing arm 404 or to the connecting arm 451. A brace 413 is rotatably attached to the connecting arm 451. A belt 412 in turn is attached to the brace 413.

Figure 19:
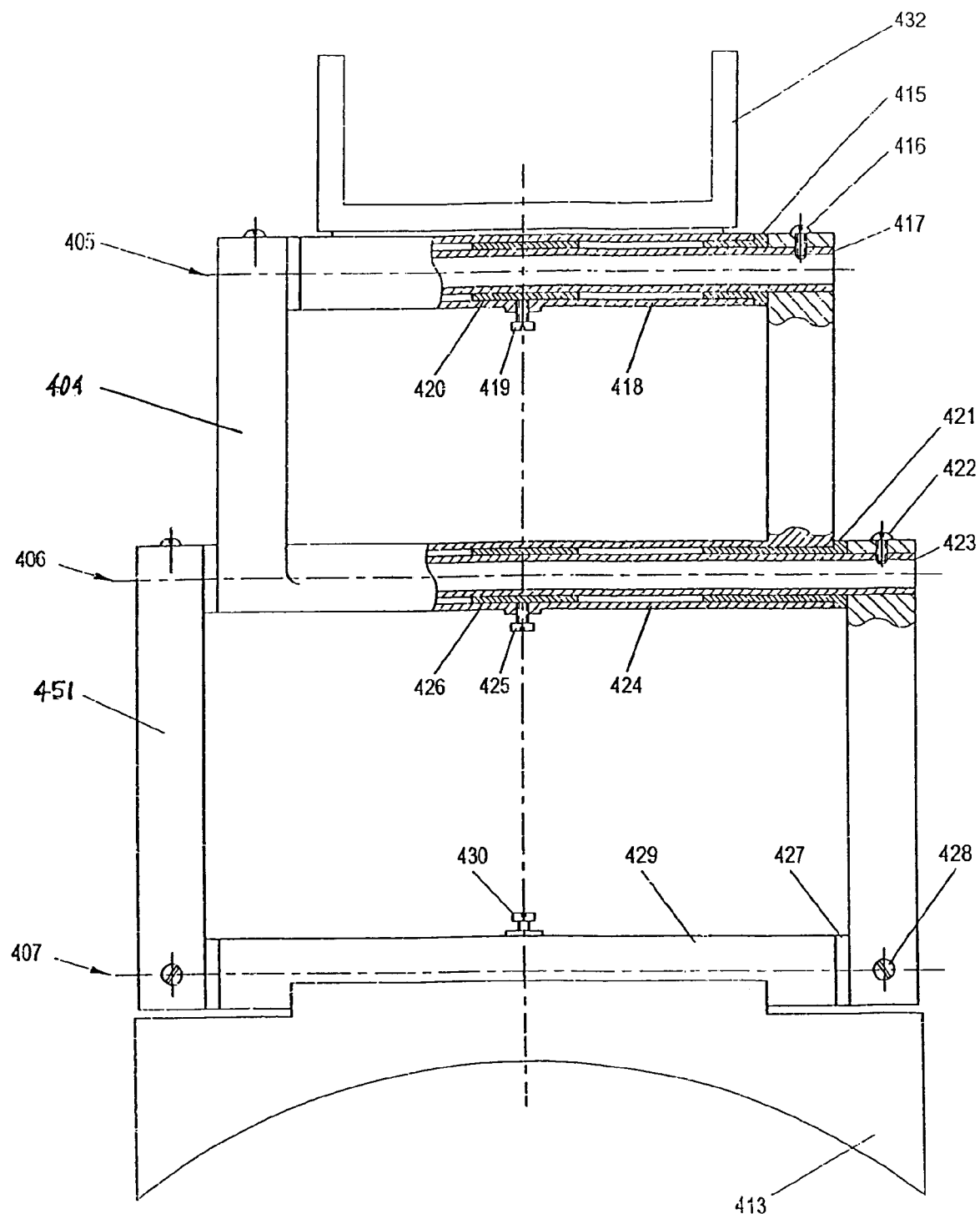
FIG. 19 is a top planar view of a stabilizing arm using brake pads.

FIG. 19 shows a detail view of the construction around the stabilizing arm 404 and around the connecting arm 451. A brake pad adjusting screw 419 is provided in outer tube 418 for adjusting the braking force exerted by brake pad 420 between a mounting structure or mounting brace 432 and the stabilizing arm 404. A bushing 415 is furnished for spacing the stabilizing arm 404 on axis 405. A brake pad adjusting screw 425 is provided in outer tube 424 for adjusting the braking force exerted by brake pad 426 between the stabilizing arm 404 and the connecting arm 451. A brake pad adjusting screw 430 is provided in outer tube 429 for adjusting the braking force exerted by a brake pad between the connecting arm 451 and the brace 413. Screw 416 serves to attach a first end of the stabilizing arm 404 to an inner tube 417. Screw 422 serves to attach the connecting arm 451 to an inner tube 423. Tube element 421 serves as a bushing to space the connecting arm 451 on the axis 406. Screw 428 attaches the second end of the connecting arm 451 to an inner tube. Tubing element 427 serves as a bushing and spaces the connecting arm 451 on the axis 407. The brace 413 is attached to the outer tube 429.

Figure 26:
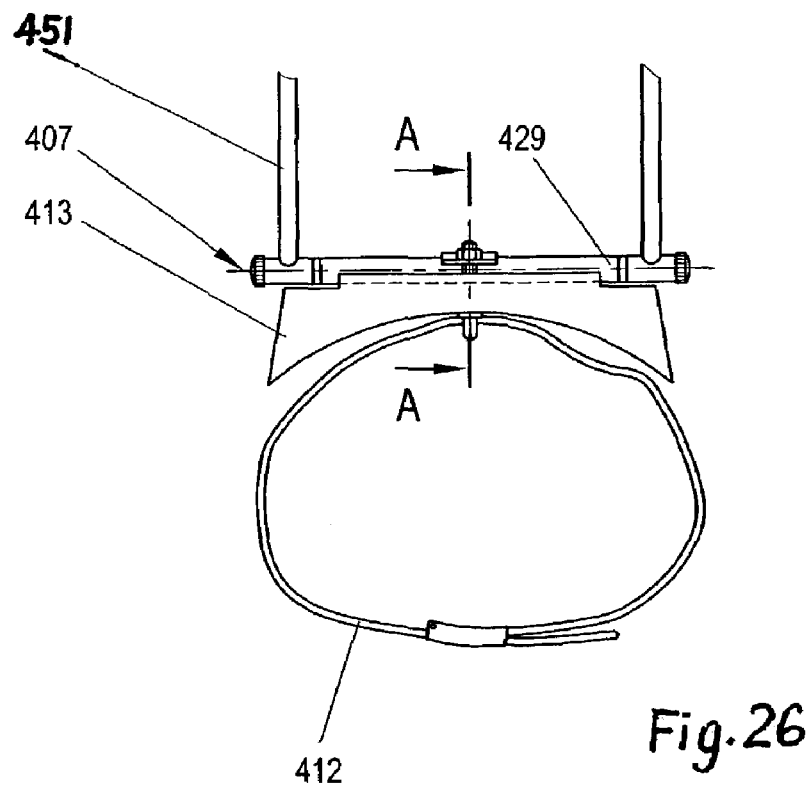
FIG. 26 is a top planar view of the attachment means for a belt of FIG. 20.
Figure 20:
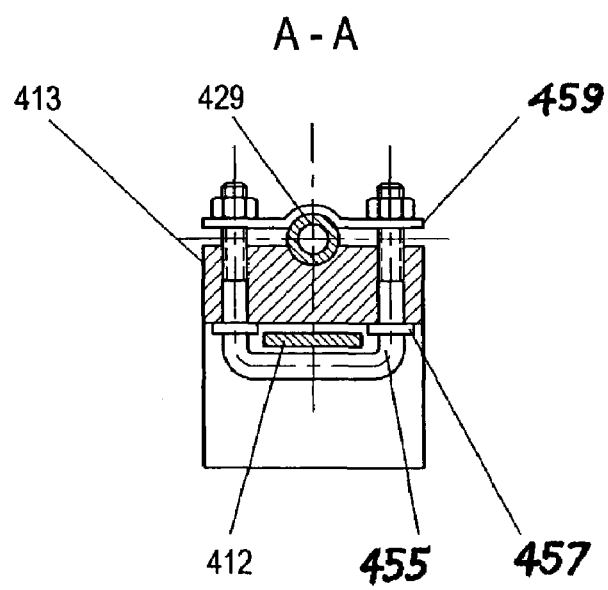
FIG. 20 is a sectional view of an attachment means for a belt.

FIG. 26 shows an alternate method of attaching an individual to a connecting arm 451. A belt 412 is used, where the belt 412 slides through a U-bolt 455 (FIG. 20). The U-bolt 455 is connected to the connecting arm 451. Support nuts 457 define the position of the U-bolt relative to the curved brace 413. A tubular frame 429 of the connecting arm 451 is seated on the curved brace 413. Nuts and a retaining plate 459 hold the tubular frame 429 tight against the curved brace 413.

Figure 27:
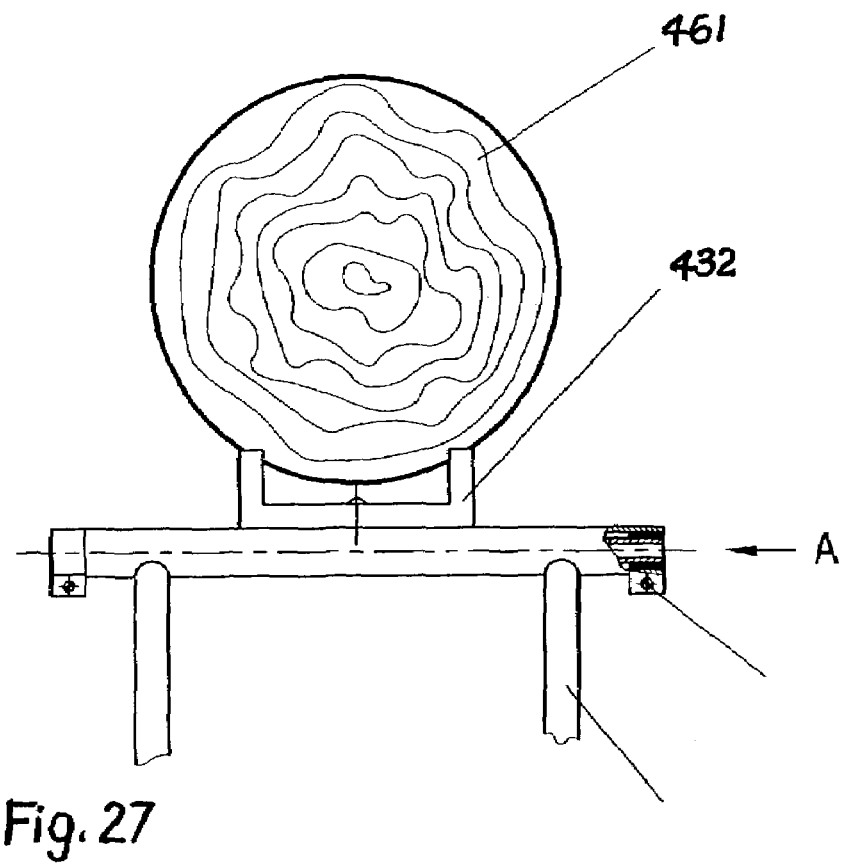
FIG. 27 is a top planar and in part sectional view of the braking system exhibiting the friction bushing of FIG. 21.
Figure 21:
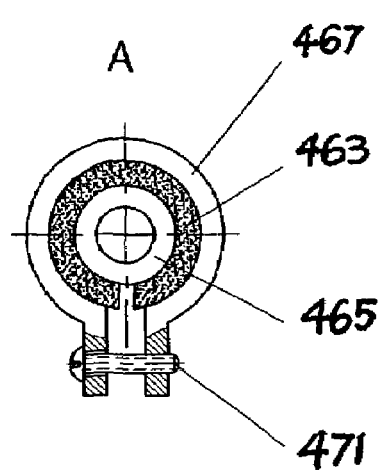
FIG. 21 is a sectional view of a braking system component exhibiting a friction bushing.

According to a further embodiment shown in FIGS. 21 and 27, a friction bushing 463 is employed, wherein the friction bushing 463 is clamped between two pieces of tubing, namely an inner piece of tubing 465 and an outer piece of tubing 467. The size of the friction is adjusted by a screw 471, wherein the screw 471 connects two planar extensions of the outer tubing 467. Tightening the screw 471 squeezes the bushing 463 between the inner piece of tubing 465 and the outer piece of tubing 467. The friction washers of the present application can be substituted by friction bushings 463. In particular, the piston type stabilizing arm described below can incorporate the friction bushing 463. The tension is adjusted by changing the squeezing force exerted on the friction bushing between an inner piece of tubing and an outer piece of tubing.

Figure 22:
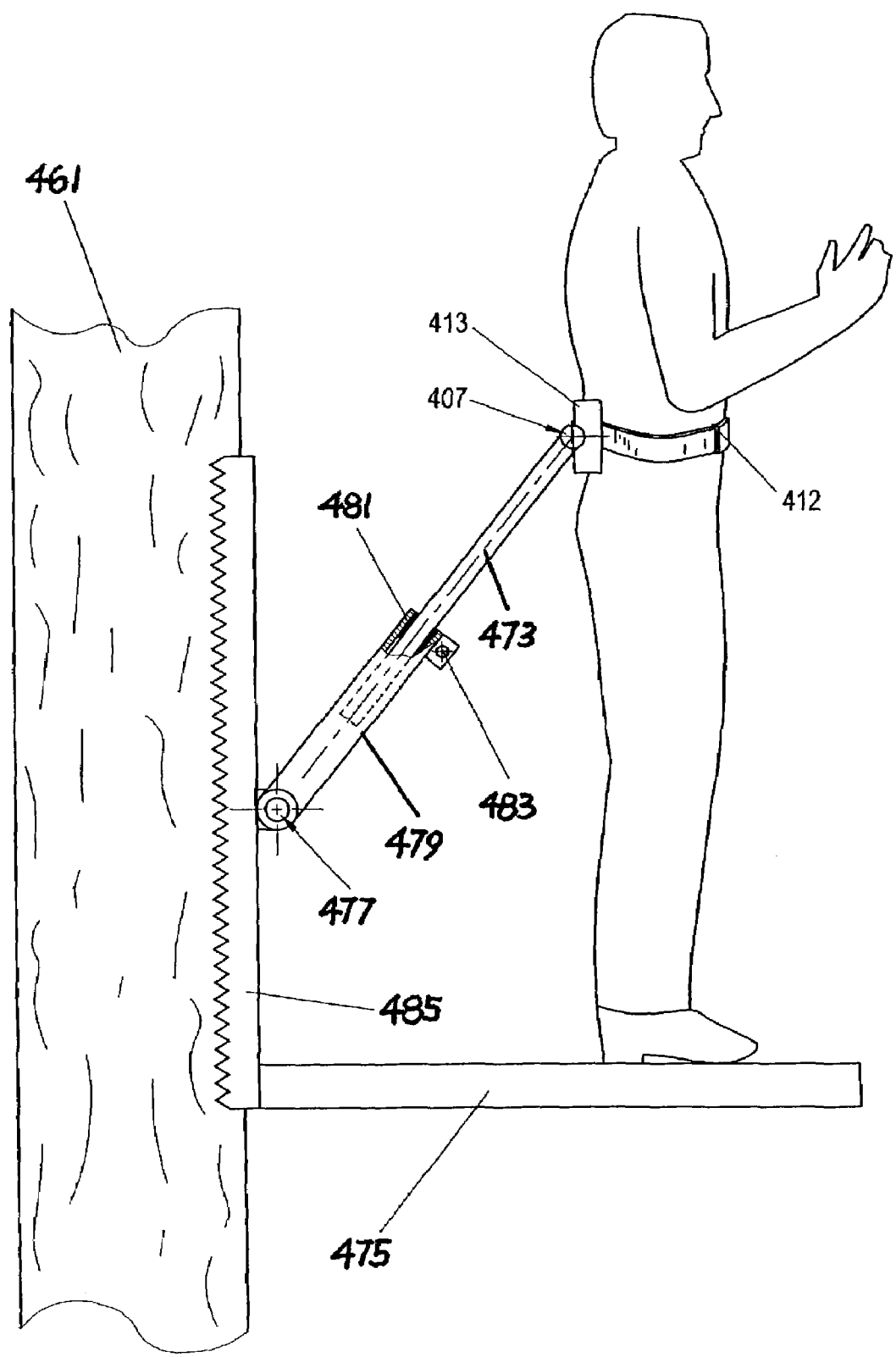
FIG. 22 is a side elevational view of a piston type stabilizing arm.

FIG. 22 shows an embodiment with a piston type stabilizing arm 473. A platform 475 for supporting a person from below is attached to a tree or pole 461. A pole attachment means 485 is attached to the pole 461 for supporting a rotation axis 477. The rotation axis 477 is fixedly supported by the tree or pole 461. A cylinder 479 has a first end rotatably attached to the rotation axis 477. A bushing 481 is furnished at a second end of the cylinder 479. The bushing 481 can be clamped tighter to adjust tension around a first end of the piston type stabilizing arm 473. A tension adjusting screw 483 can be adjusted for changing the tension around the first end of the piston type stabilizing arm 473. The piston type stabilizing arm 473 is hingedly attached with a second end to the curved brace 413 supporting and buffering the horizontal motions of the person to be protected.

Figure 23:
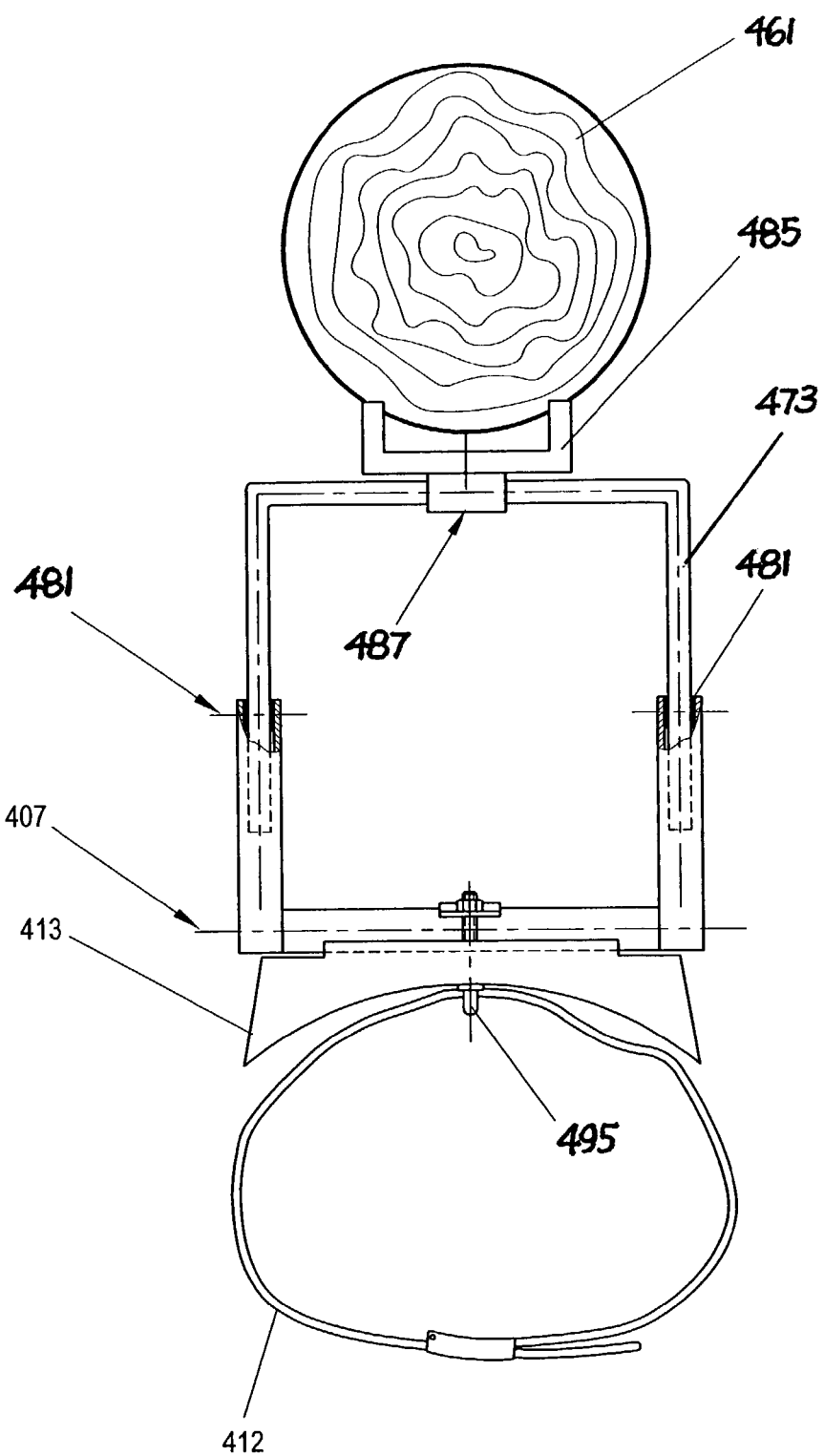
FIG. 23 is a top planar view of the piston stabilizing arm of FIG. 22.

FIG. 23 shows a view from the top of the piston type stabilizing arm. The attachment means 485 is attached to the tree or pole 461. A holding support 487 is attached to the attachment means 485. The holding support can include a bushing or a bearing for allowing rotation of the rod or tube connection between the two the piston type stabilizing arms 473. The holding support 487 supports the U-shaped double piston type stabilizing arm 473. The two piston type stabilizing arms can perform a linear motion in the two cylinders 479 subject to the frictional brake furnished by the friction bushing 481.

Figure 24:
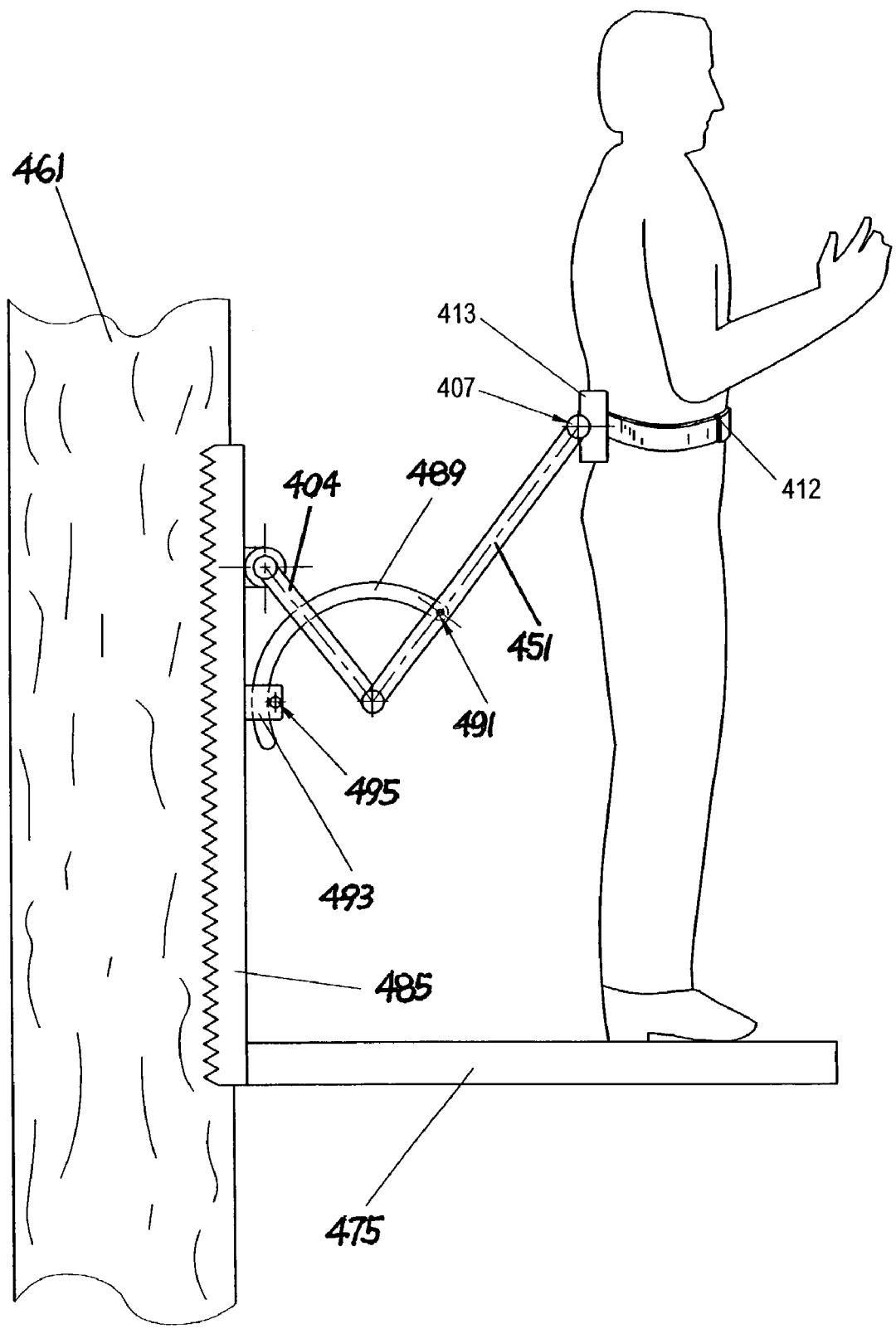
FIG. 24 is a side elevational view of a system employing brake pads for providing braking to the stabilizing arm.

Another type of friction brake employed in accordance with the present invention a slide and two brake pads are employed. An adjusting screw can be used to squeeze the two brake pads together while the slide is in the middle between two brake pads. FIG. 24 shows a construction employing brake pads and a slide. Similar to the embodiment shown in FIG. 16, a stabilizing arm 404 and a connecting arm 451 are employed. A slide 489 is rotatably attached with a second end to the connecting arm 451. Brake pads 493 are attached to the attachment means 485. The slide 489 is movable between two brake pads 493. A tension adjusting screw 495 is provided for the brake pads 493 to allow adjustment of the friction exerted by the brake pads 493 onto the slide 489. The slide 489 is guided with a first end through between two brake pads 493.

Figure 25:
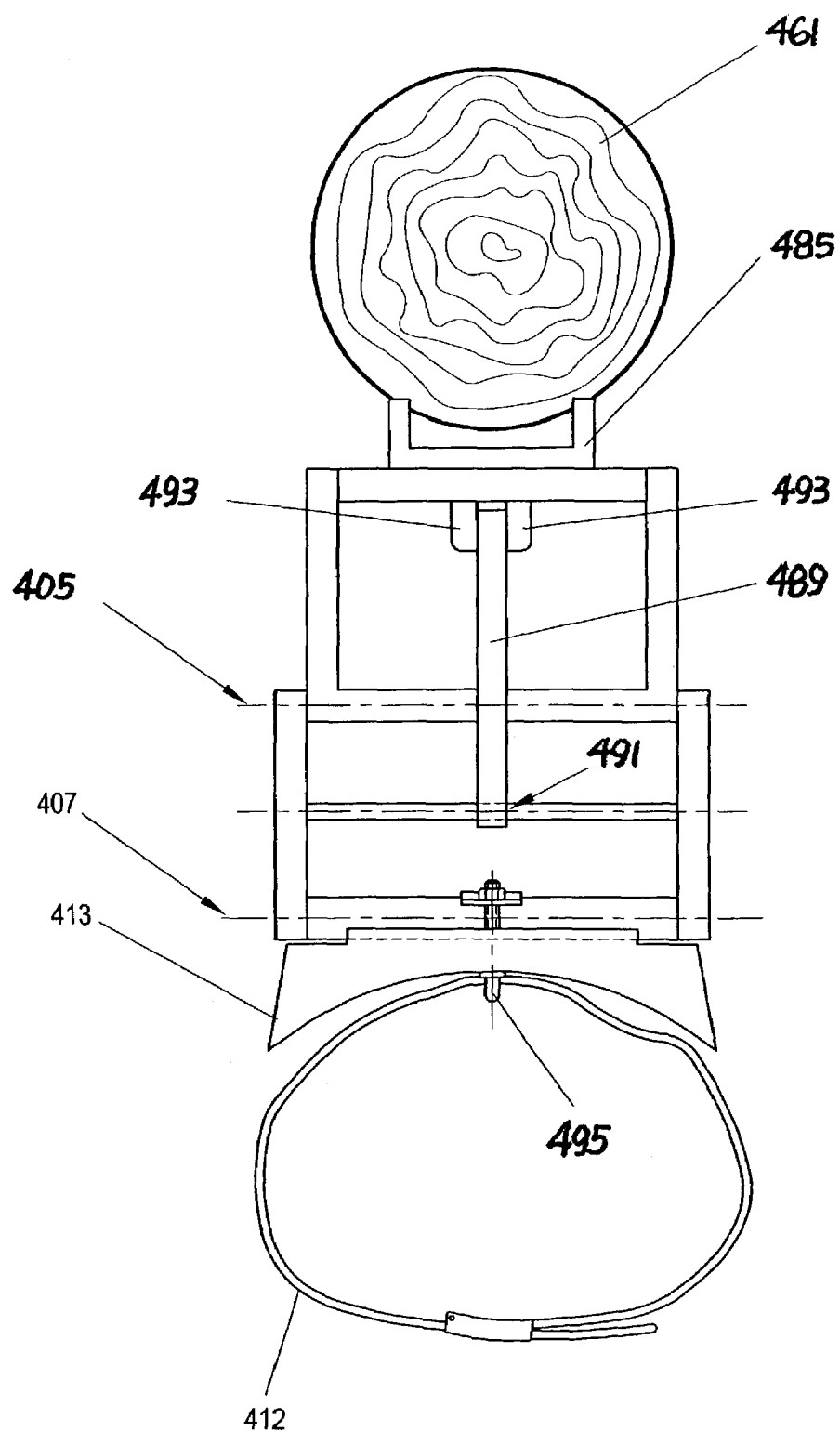
FIG. 25 is a top planar view of the system employing brake pads of FIG. 24.

FIG. 25 shows a top view onto the construction employing brake pads 493 and slides 489.

The braking system of the present invention serves for slowing or stopping a motion of a person supported on a pedestal type structure in a horizontal direction. The braking system of the present invention absorbs the energy or momentum of a person on pedestal usually by means of friction and by generation of frictional heat.

The stabilizing system with braking of the present invention is not limited to hunters supported by trees or telephone workers located on poles or support lifts, and can also be used for example by utility workmen, by construction workers or by anybody working on a building or a structure.

It will be understood that each of the elements described above, or two or more together, may also find a useful application in other types of constructions differing from the types described above.

While the invention has been illustrated and described as embodied in a device for attaching to a tree and stabilizing a bow hunter-attached thereto who is hunting game, however, it is not limited to the details shown, since it will be understood that, various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for a trunk comprising
a strap for surrounding the trunk;
a support held by the strap against the trunk;
a mechanical linkage attached to the support;
a brake furnished to the mechanical linkage;
a frame attached to the linkage for maintaining a person in position;
a belt attached to the frame to be wrapped around a person for preventing a falling of the person;
wherein the linkage comprises
a first hinge formed by a first shaft and a first jacket surrounding the first shaft and attached to the support and having a free arm; a rod having a first end attached to the free arm and having a second end;
a second hinge formed by a second shaft and a second jacket surrounding the second shaft and having a first arm attached to the second end of the rod and having a second arm;
a shaft having a first end attached to the second arm of the second hinge and having a second end attached to the frame for supporting the frame.

2. The device according to claim 1 wherein the linkage comprises a distance adjustment mechanics allowing a change in distance between the support and the frame;
wherein the brake includes an adjustable mechanical impedance for opposing force exerted on the linkage for effecting the change in distance between the support and the frame.

3. The device according to claim 2 wherein the adjustable mechanical impedance is furnished by an adjustable friction brake.

4. The device according to claim 1 wherein the linkage comprises
mechanical means for adjusting the distance between the support and the frame;
wherein the brake is furnished as an adjustable friction brake for damping and opposing a distance adjustment of the distance between the support and the frame.

5. The device according to claim 1 wherein the brake comprises
a first adjustable friction brake attached to the first hinge for damping and opposing a distance adjustment of the distance between the support and the frame;
a second adjustable friction brake attached to the second hinge for damping and opposing a distance adjustable of the distance between the support and the frame.

6. The device according to claim 1 wherein the linkage further comprises a second rod having a first end attached to the free arm and having a second end and disposed side by side to the first rod for providing additional strength;
a second shaft having a first end attached to the second arm of the second hinge and having a second end attached to the frame for supporting the frame and disposed side by side to the first shaft for providing additional strength.

7. The device according to claim 1 further comprising
a third hinge having a first arm attached to the second end of the shaft and having a second arm attached to the frame.

8. The device according to claim 1 wherein the rod is made out of tubing and wherein the shaft is made out of tubing.

9. A personal support to be held by an upright pillar structure comprising a support adapted for attachment to the pillar structure;
a strap engaging the support and surrounding the pillar structure for fastening the support to the pillar structure;
a frame for providing support to a back of a person;
a hinge having a first arm attached to the support and having a second arm;
an adjustable friction brake attached to the hinge for damping and opposing a distance adjustment of a distance between the support and the frame;
a link having a first end attached to the frame, wherein the hinge comprises a hinge rod attached to the support and a tubular piece furnishing the second arm attached to the second arm of the hinge and having a second end;
a belt furnished at the frame for surrounding a person and for preventing a person from falling.

10. The personal support according to claim 9 wherein the belt is furnished with a pair of ends to be fastened together in front of the person.

11. A device for supporting a person comprising attachment means for attaching to an elevated structure;
a mechanical linkage attached to the attachment means;
a brake furnished to the mechanical linkage;
a brace attached to the linkage for maintaining a person in position;
a belt attached to the brace to be wrapped around a person for preventing a falling of the person;
wherein the belt is sliding through a U-bolt attached to the brace.

12. The device according to claim 11 wherein the brake is furnished by a friction washer.

13. The device according to claim 11 wherein the brake is furnished by a piston type stabilizing arm.

14. The device according to claim 11 wherein the brake is furnished by a slide sliding between two brake pads.

15. The device according to claim 11 wherein the brake is furnished by a friction bushing.

16. The device according to claim 11 wherein the brake is furnished by two curved brake pads disposed within the tubing.

17. A device for supporting a person comprising
attachment means for attaching to an elevated structure;
a mechanical linkage attached to the attachment means;
a brake furnished to the mechanical linkage;
a brace attached to the linkage for maintaining a person in position;
a belt attached to the brace to be wrapped around a person for preventing a falling of the person;
wherein the brake includes
an inner piece of tubing;
a friction bushing surrounding the inner piece of tubing;
an outer piece of tubing surrounding the friction bushing and clamping the friction bushing against the inner piece of tubing.

18. The device according to claim 17 further including
a first planar extension of the outer piece of tubing;
a second planar extension of the outer piece of tubing;
a screw connecting the first planar extension to the second planar extension, wherein a tightening of the screw squeezes the friction bushing between the inner piece of tubing and the outer piece of tubing.

* * * * *